United States Patent
Grieve et al.

[11] Patent Number: 5,607,107
[45] Date of Patent: Mar. 4, 1997

[54] RETRACTABLE HOSE

[76] Inventors: James A. Grieve, 248C Broadway Avenue, Toronto, Ontario, Canada, M4P 1V9; John M. Todd, 211 Queen's Quay West, Suite 1201, Toronto, Ontario, Canada, M5J 2M6

[21] Appl. No.: 120,247

[22] Filed: Sep. 13, 1993

Related U.S. Application Data

[63] Continuation-in-part of Ser. No. 924,834, Aug. 4, 1992, abandoned.

[51] Int. Cl.$^6$ ............................ B05B 15/10; B65H 75/00
[52] U.S. Cl. .......................... 239/195; 239/198; 239/273; 137/355.23; 138/119
[58] Field of Search ..................... 239/195–198, 239/208, 273, 547; 138/119, 118, 177; 137/355.23, 357

[56] References Cited

U.S. PATENT DOCUMENTS

| | | | |
|---|---|---|---|
| 2,567,004 | 9/1951 | Benck | 239/121 |
| 2,800,925 | 7/1957 | Tollefsen et al. | 239/518 |
| 2,814,529 | 11/1957 | Arnt | 239/197 |
| 2,898,939 | 8/1959 | Fox | 239/590.5 |
| 3,035,779 | 5/1962 | Convis | 239/208 |
| 3,195,616 | 7/1965 | Taber | 160/121 |
| 3,288,169 | 11/1966 | Moss | 138/118 |
| 3,646,189 | 2/1972 | Wiedeman | 138/118 |
| 3,966,121 | 6/1976 | Littman | 239/197 |
| 4,009,734 | 3/1977 | Sullivan | 138/118 |
| 4,243,712 | 1/1981 | Hoheisel et al. | 138/118 |
| 4,478,661 | 10/1984 | Lewis | 138/119 |
| 4,582,257 | 4/1986 | Siegler | 239/197 |
| 5,332,021 | 7/1994 | Todd et al. | 160/133 |

*Primary Examiner*—Karen B. Merritt
*Attorney, Agent, or Firm*—James P. Ryther, Esq.

[57] ABSTRACT

A retractable conduit formed from a sheet of memory-set polyester. To manufacture the memory-set strip, the polyester sheet is wound into a desired coiled position. It is then heated and cooled in a manner to memory-set the sheet in a coiled form. After this process the sheet of polyester will automatically return to the coiled position after it has been uncoiled. In one form, suitable as a splashblock, the distal end of the polyester sheet is wider than the end attachable to a downspout. In another form the polyester sheet is sheathed in an elongated polyethylene tube, to form a retractable hose. In a preferred form, the distal end of the hose is supported on a spool which will roll along the ground as the hose is wound and unwound to further ensure that the hose retracts properly. The tube can also be provided with holes to act as a sprinkler if desired.

19 Claims, 4 Drawing Sheets

RETRACTABLE HOSE

This is a continuation-in-part of application Ser. No. 07/924,834 filed on Aug. 4, 1992, now abandoned.

BACKGROUND OF THE INVENTION

The invention relates, generally, to conduits, e.g. splashblocks and hoses and, more particularly, to an automatically retracting splashblock or hose suitable for use as an extension on a down spout, a sprinkler hose, a pump hose and the like.

One such retractable hose consists of a vinyl tube having two steel wires imbedded therein where the steel wires are formed so as to have a coiled shape. The steel wires wind the vinyl tube so that it will normally be in a coiled or rolled configuration. When water is forced through the tube under pressure, the tube is unwound and the water is conveyed through the tube to a remote location. When the water pressure is removed, the metal springs automatically return the tube to the rolled position. The vinyl tube also can be provided with holes along its length to allow it to function as a sprinkler. Hoses with such coiled steel wire are disclosed in U.S. Pat. No. 3,035,779 which issued 1962 May 22 to O. P. Convis and U.S. Pat. No. 3,966,121 which issued 1976 Jun. 29 to B. A. Littman.

U.S. Pat. No. 2,814,529 which issued 1957 Nov. 26 to V. R. Arnt also discloses a retractable hose that uses a flat spring steel band, a strip of resilient material such as plastic or rubber or a helical spring to provide the retracting force. The rubber or plastic tube of Arnt is provided with holes and is intended to be used as a sprinkler.

U.S. Pat. No. 4,582,257 which issued 1986 Apr. 15 to F. Siegler discloses a perforated dual-tube retractable hose which uses flat longitudinal strips of vinyl plastic, e.g. styrene, as a spring mechanism. Styrene strips are inserted into two adjacently-joined tubes. The hose is then wound tightly on a core and strapped to prevent unwinding. The hose is then boiled in water to set the styrene into a "clock spring" configuration.

A major problem associated with all of the above-mentioned types of retractable hoses is that over time the springs will lose their "memory" such that the hose is not rewound to its proper position. The problem is compounded in prior art devices which use two springs because the force applied by each spring will differ as the springs lose their "memory", unless the springs are matched. Matched springs are quite expensive, however. In addition, the positioning and alignment of the springs relative to each other is crucial to the proper functioning of the springs in the hose.

Another problem with the prior art devices that use metal springs is that there is a high capital cost for the manufacture of the hose. Also, with hoses longer than approximately 1.2 meters it becomes increasingly difficult to ensure that the two springs are kept in alignment, because of the characteristics of the metal wire spring. Because these hoses use two springs, each of which represents a point force, they require a substantial "head" of water in the downspout to uncoil the springs. As a result, the application of these devices is somewhat limited. For example, a 1.2 meter length of hose may be insufficient to remove water from adjacent a foundation or to cross a driveway or sidewalk. Moreover, in the known hoses using metal springs, the coiling mechanism is heat sealed within the hose. As a result, the hoses must be made of relatively expensive R.F. sealable material. In addition the capital costs, associated with manufacture of the hoses with metal springs, are high.

Finally, it is possible for metal springs to rust and corrode over time. This is especially problematic if the hose is intended to be used with water or corrosive liquids.

Prior art self coiling hoses of the type discussed above also suffer, in hot climates, from the vinyl or other plastic material being sealed along portions of their length, from the action of the sun. The heat from the sun may heat seal the inner surfaces of the tube together, thus destroying the tubular nature of the hose.

Thus, for many reasons, an improved automatically retracting hose is desired.

SUMMARY OF THE INVENTION

The retractable conduit of the invention overcomes the above-noted shortcomings of the prior art. The conduit comprises a memory-set, elongated sheet of crystalline or semi-crystalline thermoplastic polymer, said sheet having two ends, one of which is attachable to the exterior of a spout through which fluid may flow, said sheet being shaped and memory-set in such shape that said sheet is able to move from a compact form to an elongated form when a force is applied thereto and to retract to said compact form when said force is removed, the fluid exerting said force when flowing over said sheet.

In one embodiment the end of the conduit distal to the attachable end is substantially wider than the attachable end.

In one embodiment the thermoplastic polymer is selected from polyamides and polyesters.

In another embodiment the polyester is polyethylene terephthalate.

In yet another embodiment the polyamide is nylon 6,6.

In a further embodiment the elongated sheet is oriented, particularly machine direction oriented or biaxially oriented.

In a preferred embodiment, the polyester sheet has a thickness of at least about 75 μm.

In yet another embodiment the polyester sheet has a thickness of from 75 μm to 1000 μm thickness memory-set oriented polyethylene terephthalate.

In yet another embodiment the conduit comprises a) an elongated flexible thin-walled tube of film having an inlet end and a distal end; b) a substantially inextensible sheet of crystalline or semicrystalline memory-set thermoplastic polymer located within said tube and extending for substantially the length of the tube, said sheet being shaped and memory-set in such shape that said sheet is able to move from a compact form to an elongated form when a force is applied thereto and to retract to said compact form when said force is removed; and c) means for connecting the inlet end of said tube to a spout source for fluid, the fluid exerting said force when flowing in said tube.

In a further aspect of the invention the conduit comprises a spirally coiled, memory-set, elongated sheet of crystalline or semi-crystalline thermoplastic polymer, said sheet having two ends, one of which is attachable to the exterior of a spout, said sheet being sheathed in a flexible tubular film.

The tubular film can also be provided with holes to create a sprinkler if desired.

In a further embodiment the conduit comprises a spirally coiled, memory-set, elongated sheet of crystalline or semi-crystalline thermoplastic polymer, said sheet having two ends, one of which is attachable to the exterior of a spout, said sheet being sheathed in a flexible tubular film such that there is a first elongated portion of flexible tubular film on one side of the memory-set sheet and a second elongated portion of flexible tubular film on the opposing side of the memory-set sheet, said second portion being perforated at intervals along its length, there also being a flexible elongated film interposed between said memory-set sheet and the second portion, such that the memory-set sheet and the flexible elongated film may be attached to the spout with the spout between the memory-set sheet and the flexible elongated film. Such elongated film is intended to act as a valve for the plurality of holes.

In yet another embodiment the elongated flexible film is selected from films of polyester, polyamide and polyolefin, especially polyethylene terephthalate, nylon 6,6 and polyethylene.

In another aspect the conduit comprises a spirally coiled, memory-set, elongated sheet of crystalline or semi-crystalline thermoplastic polymer, said sheet having two ends and two longitudinal edges, one of said ends being attachable to the exterior of a spout, and said longitudinal edges being attached to corresponding edges of a film or sheet of a second thermoplastic polymer to form a hose.

In one embodiment the second thermoplastic polymer is selected from the group consisting of nylon, polyethylene and polyester.

In further embodiments the longitudinal edges are joined by mechanical fastening, heat sealing, or heat stitching.

In yet another embodiment the second thermoplastic polymer and the crystalline or semi-crystalline thermoplastic polymer are the same polymer and both are memory set in a spiral coil. In one such embodiment the conduit is made from a sheet of crystalline or semi-crystalline thermoplastic polymer having two longitudinal edges, wherein the sheet is folded longitudinally and the two longitudinal edges are joined together so that a hose is formed, and wherein the thus-formed collapsed hose is memory-set in a coil.

In a further embodiment said second thermoplastic sheet is perforated at intervals along its length, and there is a flexible elongated film sheathed in the hose, such that the flexible elongated film is adapted to be attached to the spout between the spout and the second thermoplastic sheet.

In a preferred embodiment, the distal end of the hose is supported on a spool which is adapted to roll along the ground as the hose is wound and unwound to further ensure that the hose retracts properly.

To manufacture the coiled memory-set sheet, the polymeric sheet is wound into the desired retracted, e.g. coiled, position, heated and cooled. After this process, the sheet of polyester will assume its compact form in the retracted position unless a force acts upon it. The sheet will return to the desired retracted position, i.e. compact form, once the force is removed.

The spout to which the present conduit may be attached may be a downspout, a tap, a hose bib, a pipe, a hose, a pump outlet, or other outlet intended for the discharge of fluids. Clearly, other liquids besides water may be dispersed using the present invention. Additionally, the tubular embodiments of the invention may be used with air or other gas, if desired. The present invention is particularly useful for connection to the end of a down spout on residential, industrial or commercial buildings, in order to disperse rainwater in a manner that does not wash soil from the foundation of a building.

DETAILED DESCRIPTION OF THE INVENTION

The memory-set thermoplastic film or sheet is sometimes referred to hereinafter as polyester film or sheet or Mylar, which is a trade mark for E.I. du Pont de Nemours and Company's polyester film. It will be understood that such reference is for exemplification and clarity of description and is not intended to be limiting.

Referring more particularly to FIGS. 1 to 4, the retractable hose of the invention is shown generally at 1 consisting of an elongated tube 2 made of polyethylene film or other suitable flexible material defining a fluid transporting path 3 for transporting a liquid or gas. A sheet of a coiled memory-set thermoplastic polymer 4, in the preferred embodiment, is oriented polyethylene terephthalate, and is located in path 3 such that tube 2 surrounds sheet 4.

Figure 1:
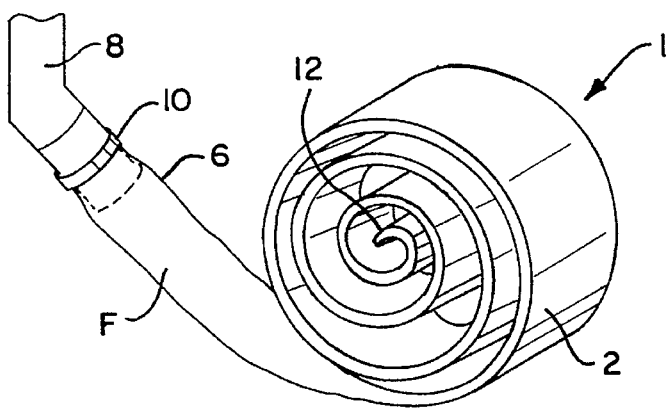
FIG. 1 shows a three-quarter view of a rolled-up embodiment of the invention.
Figure 2:
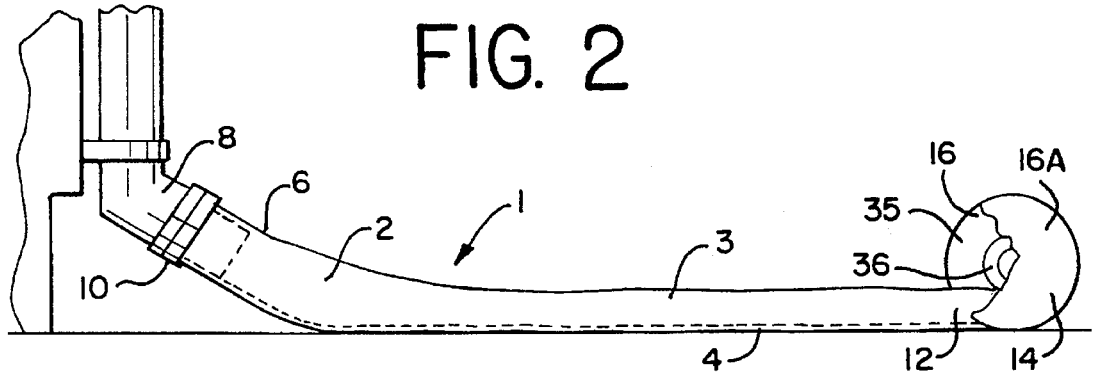
FIG. 2 shows a side view of a second embodiment of the retractable hose of the invention.

As shown in FIGS. 1 and 2 the inlet end 6 of tube 2 is open and dimensioned to be secured to a source of water, other liquid or gas, e.g. spout 8. For example, inlet end 6 of tube 2 can be dimensioned to fit over a down spout, garden hose, pump outlet or the like. When spout 8 is relatively large in diameter, as in a down spout, the sheet 4 is preferably not coiled in the area immediately adjacent end 6 such that the hose in this area has a flat shape F thereby to facilitate the mounting of the hose on spout 8.

Tube 2 can be secured to the spout 8 by a mechanical clamp or band 10, as shown in FIGS. 1 and 2. Alternatively, the tube of flexible film 2, e.g. polyethylene film, adjacent inlet end 6, can be expanded during manufacture such that it can be heat shrunk on liquid source 8 by a heat gun, hair dryer or the like.

Figure 3:
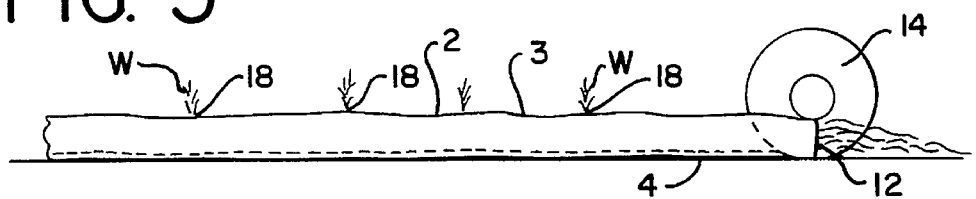
FIG. 3 shows a side view of the second embodiment of the invention used in a first mode.
Figure 4:
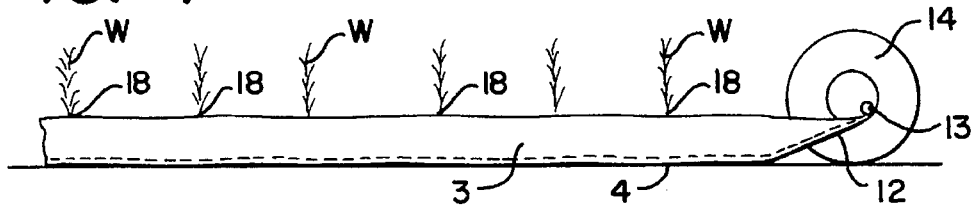
FIG. 4 shows a side view of the second embodiment of the invention used in a second mode.

The distal end 12 of tube 2 can be left free, as shown in FIG. 1, or can be attached to a spool 14 as shown in FIGS. 2 to 4. While the memory-set sheet 4 will tend to rewind the hose in a uniform manner, the use of spool 14 further ensures that the hose will be properly wound along a straight line, as flanges 16 and 16A maintain the lateral position of the tube as it winds and unwinds. It has been found that the spool operates better when flanges 16 and 16A are tapered such that the distance between the two flanges of the spool are wider at circumference than at the centre of the spool. Such a flange is shown more particularly in FIG. 4A.

The distal end 12 can either be closed by a clamp 13 as shown in FIG. 4 or left open as shown in FIG. 3. When end 12 is left open, hose 1 will act as a simple conduit to convey the liquid from inlet end 6 to the distal end 12. When the distal end 12 is sealed the pressure of the liquid in tube 2 will increase. This pressure increase can be utilized to provide a sprinkler action, if desired, by providing relatively small holes 18 along the length of tube 2, as shown more particularly in FIG. 5. The liquid will be forced out from holes 18 by the liquid pressure. FIGS. 3 and 4 show sprays of water W emanating from holes 18. The use of the removable clamp 13 allows end 12 to be opened so that debris, leaves and other material that may get trapped in tube 2 to be flushed out. Even when the hose is not used as a sprinkler, a few holes 18 should preferably be provided to enable the fluid, e.g. liquid, trapped in the hose after use, to escape as the hose retracts into its coiled position. No holes are required in applications where the liquid pressure in the hose can be released by other means. It is sometimes desirable to have a large relief hole, e.g. 6 to 10 cm across, in the side of the tubular flexible film, at the distal end.

Commercially available polyester sheet suitable for use in the present invention, e.g. Mylar® polyester film, is usually biaxially oriented, flat and heat set in an annealing step. Homopolymer polyethylene terephthalate has a glass transition temperature ($T_g$) of about 70° C. and a crystalline melting temperature of about 255° C. During annealing of the film, crystallinities of about 40% are achieved. In the case of polyethylene terephthalate, even though the $T_g$ is about 70° C., it will not crystallize easily at temperatures below about 110° C., even if left at an hour or more between these temperatures. Although not wishing to be bound by any theory, it is thought that thermoplastic polymers having a glass transition temperature above ambient temperature are suitable for use in the present invention.

For tubular embodiments wherein the polyester sheet is sheathed in a flexible film, e.g. polyethylene film or similar, the polyester sheet preferably has a thickness of at least about 150 μm, more preferably from 150 μm to 750 μm, and especially from 200 μm to 375 μm. The polyester sheet may be a single sheet or comprise multiple sheets. Multiple sheets are useful when sheets of the right thickness are unavailable. For example, in commercial practice, sheets in excess of 355 μm thick are difficult to find, and if a sheet of about 710 μm is required for performance of the retractable tube, two sheets of 355 μm thick film may be used instead. Indeed, thicker sheets, e.g. greater than about 700 μm, also tend to be less flexible than desired and it is preferable to use multiple thicknesses of thinner sheet.

Figure 7:
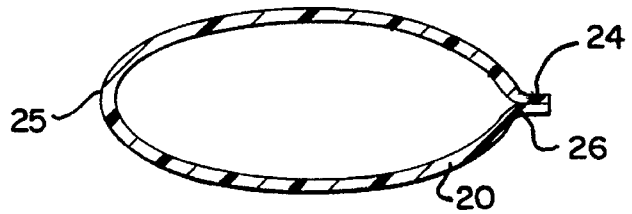
FIGS. 7 and 8 show section views of alternate embodiments of the retractable hose.
Figure 8:
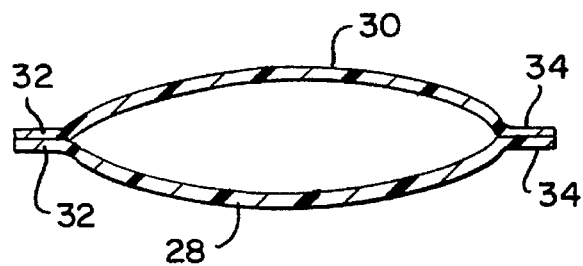

For tubular embodiments made entirely of polyester sheet, e.g. as shown in FIGS. 7 and 8, the polyester sheet preferably has a thickness of at least about 75 μm, and especially from 100 μm to 150 μm.

The thickness of the memory-set sheet is chosen partly on the basis of the desired length of the hose when uncoiled, partly on the thickness, weight and flexibility of the flexible film sheath, if any, and partly on the coiling tension available from the sheet. Thicker memory-set sheets are desirable when the length of the coiled tube (when uncoiled) is particularly long, e.g. 3 to 4 meters long or longer. The thicker sheets are also desirable if the sheathing flexible film is thick. For example, for a 4 meter long hose sheathed in 150 μm thick tubular polyethylene film, 355 μm thick memory-set polyester film is desirable.

In certain cases, when the hose is intended to uncoil for relatively long distances, e.g. 3 to 4 meters or longer, it may be desirable for the inner part of the coil to be at the end attachable to the spout of the hose rather than at the distal end. This is sometimes referred to as being reverse wound.

Figure 13:
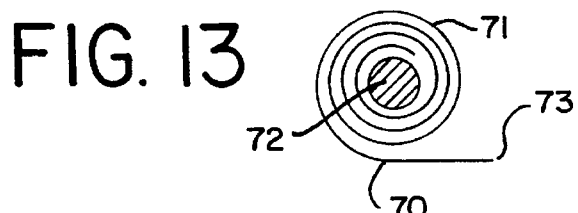
FIG. 13 shows a sectional view of coiled film prior to being reverse wound.
Figure 14:
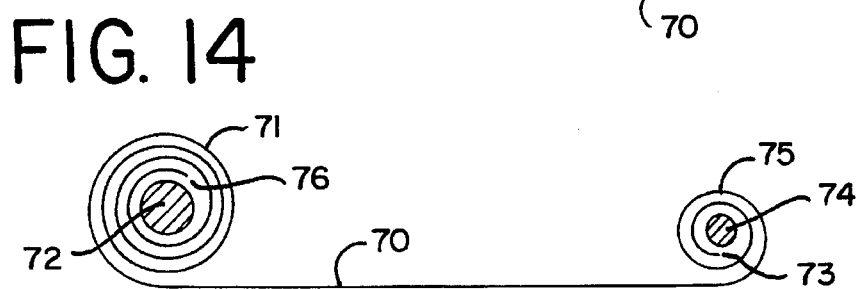
FIG. 14 shows the coiled film of FIG. 13 in the process of being reverse wound.

FIGS. 13 and 14 illustrate reverse winding of coiled film which takes place after the film is memory set in coiled form. In FIG. 13, film 70 is in a memory-set coil 71, which is coiled on a mandrel 72. The free end 73 of the coiled film is on the outside of the coil. The free end 73 is pulled and fed around a separate mandrel 74, as shown in FIG. 14. Mandrel 74 is rotated so that the film 70 is unwound from mandrel 72 and would up on mandrel 74. The free end 73 is then on the inside of coil 75 and the inner end 76 of coil 71 is on the outside of coil 75. Coil 75 is a tighter coil than coil 71 because of the small radius of curvature at end 76 when in coil 71. As a result, coil 75 has more recoiling power.

To create the memory-set sheet 4, a length of polyester sheet, such as Mylar® polyester film or other crystalline or semi-crystalline polymer is configured as desired into a coil. The coil has an axis transverse to the longitudinal direction of the sheet. The coil is wound such that each portion of the coil completely overlays an underlying portion. The coil has a spiral cross-section such that, when viewed from a position exterior to the coil, along the axis, the coil looks like a relatively tightly wound spiral.

If the coiled sheet is to be sheathed in a flexible tubular film, e.g. polyethylene film, prior to rolling the polyester sheet into a coil, a heat resistant film may be placed on the polyester film so that the coiled film is interleaved with the heat resistant film. The heat resistant film, e.g. polytetrafluoroethylene film has a thickness about twice the thickness of the polyethylene film which is to be used as the sheath. The heat resistant film may be another sheet of polyester, i.e. there is a "double winding" of polyester sheet. The second sheet may be used for a second hose. It is to be understood that such interleaving is not necessary for practise of the invention.

The coiled polyester film is then heated to a temperature which has been predetermined and is a temperature at which the sheet, when cooled, will remain set in a coiled form. The temperature is easily predetermined by simple experimentation. The thus-coiled polyester sheet is cooled in order to set the sheet, thus giving it its memory-set, compact form, characteristic. The interleaved sheet, if any, is removed. The memory-set sheet when so processed will retain the desired configuration absent a force acting thereon and will return to that configuration after the force is removed. The purpose of the interleaving sheet is to ensure that there is no residual tension in the coil when it is coiled in sheathed form.

Figure 4A:
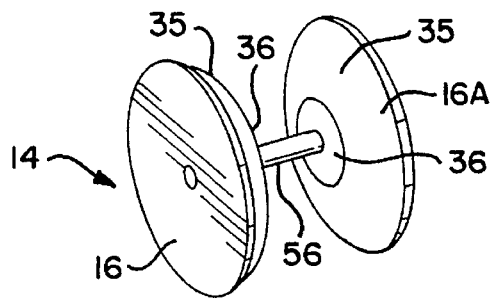
FIG. 4A shows a three-quarter view of a preferred spool useful in the present invention.

For long retractable hoses, it is preferable for a spool to be attached to the distal end of the hose, in order to assist in providing a neat coil in its retracted position, and to assist the coil in unrolling straight. As will be seen more clearly in FIG. 4A, the spool comprises flanges 16 and 16A, joined coaxially with spindle 56. The flanges 16 and 16A have peripheries 35 and centres 36. Preferably the distance between the peripheries 35 of the two flanges is greater than the distance between the centres 36 of the flanges. This assists in re-coiling of the hose after it has been extended. It is desirable that the rolling edges of the flanges are about 4 to 10 mm wide. As shown in FIG. 4A, the distance between flanges 16 and 16A can remain constant for part of the way axially from the spindle, and then widen towards the peripheries 35 of the flanges.

When the memory-set sheet is sheathed with tubular flexible film, it is desirable that the layflat dimension of the tube is only marginally wider than the width of the memory-set sheet. For example with a 15 cm wide memory-set oriented polyester sheet, a polyethylene tubular film having a layflat dimension of 15.3 to 15.45 cm is desirable. If the sheath is wider, there is a tendency for the sheath to ruck longitudinally after several coilings and uncoilings of the hose.

Figure 5:
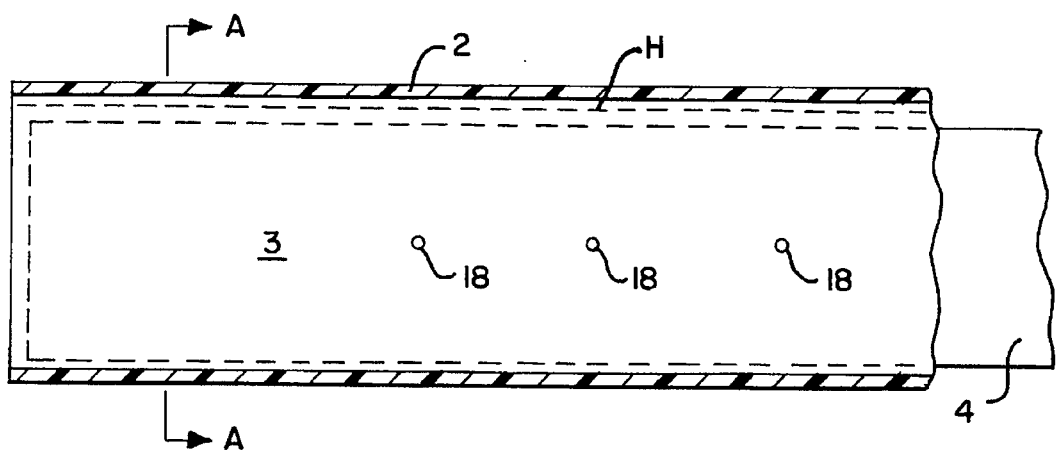
FIG. 5 shows a top view of one embodiment of the invention.
Figure 6:
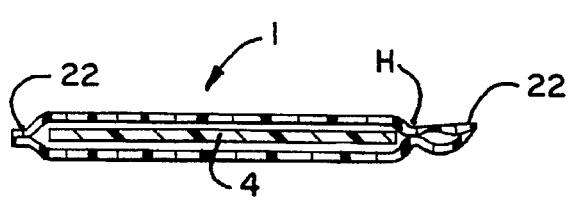
FIG. 6 shows a section view along line 6—6 of FIG. 5.

If the layflat dimension of the sheath of tubular film is somewhat wider than the polyester sheet, then the width of the tubular film may be narrowed by longitudinally heat sealing the edges of the tube. It is not necessary that the longitudinal seal be continuous. Longitudinal heat seals for distances of approximately 3 to 5 cm, separated by gaps of 3 to 5 cm are sufficient in many applications. For example the 15 cm wide memory-set oriented polyester sheet referred to above may be sheathed in a polyethylene tubular film having a layflat dimension of 16 cm, in which the effective width of the tubular film has been reduced to 15.3 cm by longitudinally heat sealing the edge of the tubular film with a heat seal 0.7 cm from the edge. A longitudinal heat seal is shown in FIGS. 5 and 6 at H.

Some polyester sheets or films have a propensity to curl at the longitudinal edges when memory set in a compact form, e.g. a spiral coil. Edge curl may be useful in guiding water along the conduit, and in the case of tubular hoses with a flexible film sheath, may assist in keeping the weight of water on top of the memory-set sheet and thus assist in unrolling the sheet. Edge curl may also assist a polyethylene sheath to form a round cross-section when filled with water or other fluid. For some applications, e.g. the splashblock, which is described in more detail in reference to FIGS. 10 and 11, edge curl may be useful in guiding water along a conduit which is made of a single sheet of polyester, i.e. it is not sheathed.

Edge curl can be avoided, if desired, by selectively heat treating the sheet.

To avoid edge curl, the memory-set sheet may also be made by heat treating a plurality of spaced-apart narrow, e.g. 12 mm wide, transverse strips in the sheet, leaving the areas intermediate the strips unheated. This could be accomplished, for example, by exposing the polyester sheet to heaters having localized heat application so that substantial areas of polyester sheet are not heat treated, between areas which have been heat treated and memory-set. This will result in a sheet which will self-coil but since there are substantial areas along the respective edges which do not have coiling memory, edge curl is minimized.

Avoidance of edge curl may also be accomplished by preferential heat treatment to achieve the memory-set transverse strips, by coating the polyester selectively with a microwave absorbing material, such as metallic paint. When coiled and exposed to microwave radiation, only the selected areas will influence the memory imparted to the sheet.

An alternative means for controlling edge curl is to fold the edges longitudinally in a crease to form a selvedge, for example using a hot iron. When coiled and heat-treated to provide the memory, the selvedge is effective against edge curl.

Further details of the construction and manufacture of the memory-set sheet 4 are to be found in copending U.S. application, Ser. No. 07/880,491, the disclosure of which is incorporated by reference.

Figure 15:
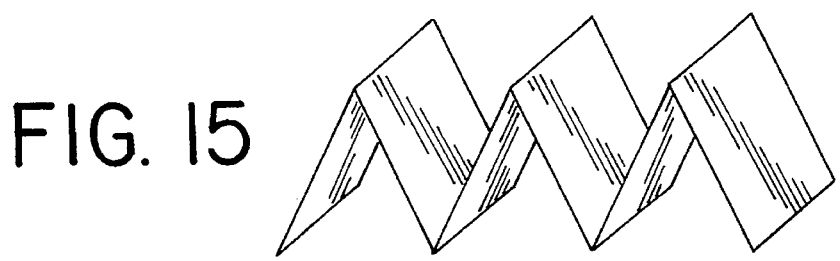
FIG. 15 shows a perspective view of an accordion-shaped embodiment of the invention.

In FIGS. 1 to 4, 10 and 11, the sheet is configured as a wound coil. It will be appreciated that other configurations such as an accordion fold can be used as shown in FIG. 15, if desired. An accordion fold would not be appropriate for extension over the ground, for example as a rainspout extension but could be useful as an air vent on the side of a building.

Referring to FIG. 7, the retractable hose of the invention can be constructed using only a memory-set sheet 20 with the tube 2 eliminated. The sheet 20 is folded along its length as shown at 25 and the longitudinal edges 24 and 26 are joined together, e.g. heat sealed, heat stitched or mechanically stitched with elastomeric thread, such that the sheet 20 forms a tubular conduit for transporting the liquid or gas. In order to join the edges by heat sealing, the edges to be joined would be coated with a heat-sealable polymer, e.g. low density polyethylene. The sheet 20 is rolled or folded as described previously to create a retractable hose.

Referring to FIG. 8, the hose can also be formed of two memory-set sheets 28 and 30 joined together at their longitudinal edges 32 and 34 to create the conduit. Again, the sheets 28 and 30 are rolled or folded as previously described to create the retractable hose.

For the embodiments in FIGS. 7 and 8 a thickness of between 75 and 150 µm oriented polyester terephthalate, e.g. Mylar®, will be suitable for most applications.

Figure 9:
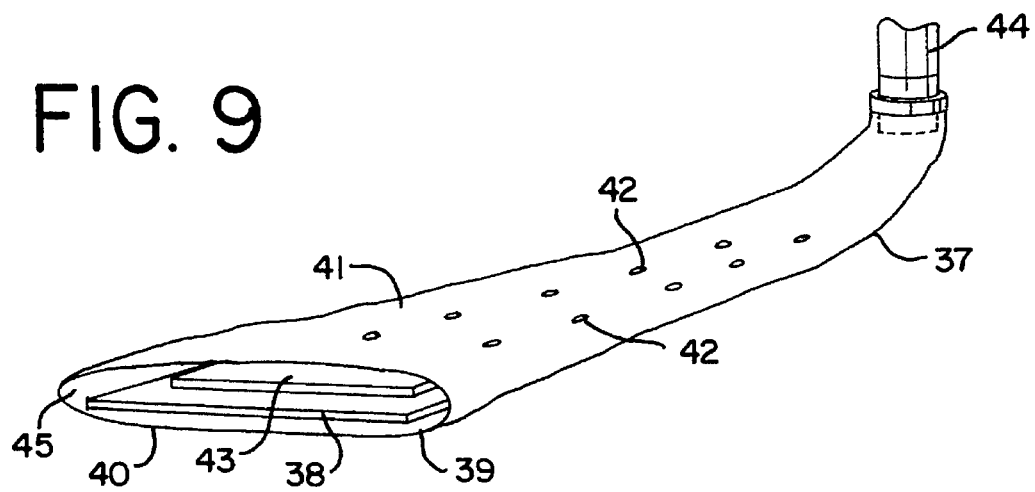
FIG. 9 shows a cut away view of a perforated and valved tubular embodiment.

FIG. 9 relates to a valved embodiment of the perforated hose 37 of the present invention. It will be seen that the memory-set polyester film 38 is sheathed with tubular polyethylene film 39. The lower and upper portions of the tubular film are identified as 40 and 41 respectively. The upper portion is perforated at intervals along its length with holes 42. Interleaved between polyester film 38 and upper portion 41 is an elongated flexible film 43. When connecting the hose to downspout 44, polyester film 38 and flexible film 43 are arranged on opposite sides of downspout 44 so that water from downspout 44 will flow between polyester film 38 and flexible film 43.

In operation, when there is no rain, the hose remains coiled up, as shown in FIG. 1. After a rain, water flows through downspout 44 and into hose 37, between polyester film 38 and flexible film 43. The pressure of the water in the hose causes the coil to unwind and at the same time forces flexible film 43 against upper portion 41, thus closing off holes 42. When the coil is fully extended, water flows out of the open distal end 45 of the unwound hose.

Flexible film 43 may be of polyethylene, polyester or similar material. When the memory-set film 38 and the flexible film 43 are both polyester, the thickness of film 38 may be about 250 µm and of film 43 may be about 12 µm. When the film 43 is polyethylene, a thickness of 25 µm is suitable.

A single memory-set sheet of the invention will retract in a straighter and more consistent manner than the two point-force springs of the prior art. Also the length and width of the hose are not as restricted as with the prior art device such that the hose can be made long enough to cross driveways and the like. The memory-set sheet provides a uniform force which will operate with less "head" than the two spring arrangement of the prior art thereby minimizing backup and the problems associated therewith such as freezing of water or accumulation of debris. Moreover, because the memory-set sheet is not heat sealed within the tube, the hose can be made of less expensive material than the heat shrink vinyl of the prior art. Furthermore, the polyester and other memory-set thermoplastic sheets used in the present invention are not subject to being accidentally heat sealed by heat from the sun. In the tubular forms of the invention, the memory-set sheet thus prevents unwanted heat sealing of the inner walls of the film used for the tube.

Figure 10:
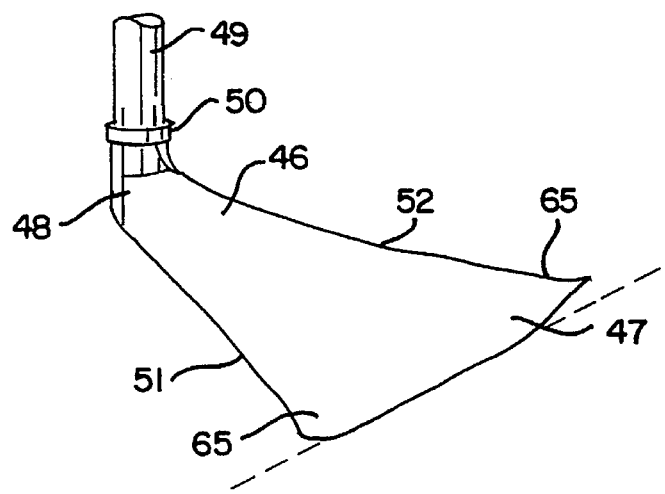
FIGS. 10 and 11 show a non-tubular embodiment, with a splayed end, suitable for use as a splashblock.
Figure 11:
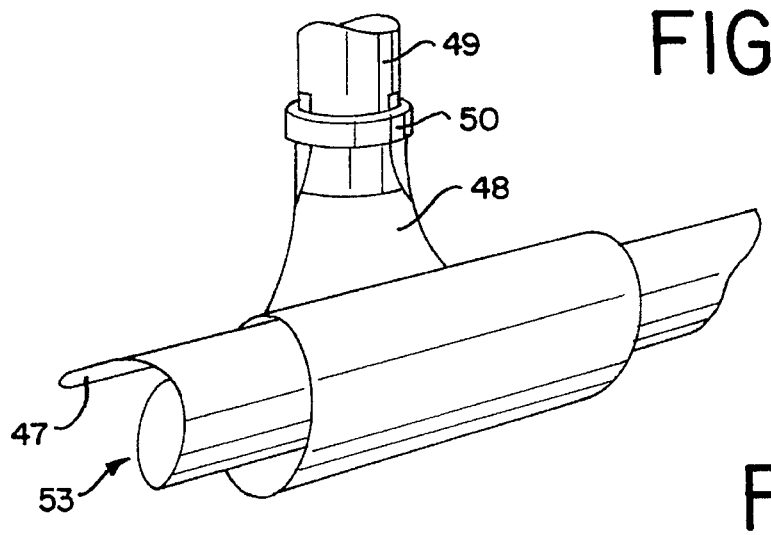

FIGS. 10 and 11 show a non-tubular aspect of the invention. It is intended to replace splashblocks. Sometimes splashblocks are made of plastic but more often they are made of heavy, cumbersome pieces of concrete or stone. With a conventional splashblock, water pours from a downspout onto the splashblock. The purpose of the splashblock is to disperse the water over a wide area rather than allowing a torrent of water to pour directly adjacent the foundation of a building. The present conduit comprises a single sheet of memory-set polyester film 46 which is substantially wider at its distal end 47 than at the end 48 attached to the downspout 49, by clamp 50. Although the polyester film 46 may be flat in its transverse direction it may also be heat set to have a slight curl 65 at longitudinal edges 51 and 52. It is preferred that the width of the film 46 at its distal end be from 30 cm to 60 cm and the length of the film 46, when uncoiled, be from 60 cm to 1 meter. FIG. 11 shows the memory-set splashblock in its compact form, i.e. in coil 53.

Figure 12:
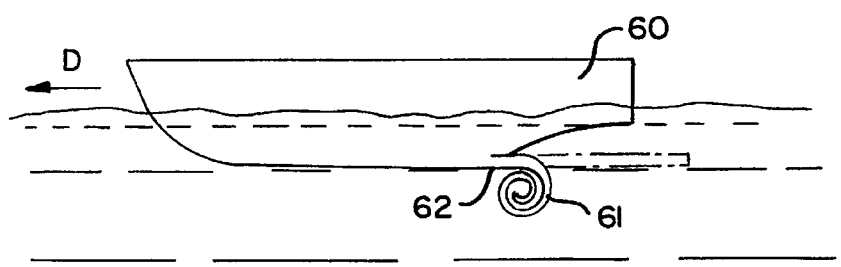
FIG. 12 shows a cross-sectional view of a boat with an automatic drain therein.

FIG. 12 shows a boat hull 60, with an automatic drain 61 in the bottom for removal of bilge water. Coiled tube 61 is connected to drain hole 62. When the boat is stationary in the water, the tube 61 is in its coiled position as shown with the solid lines. The tube 61 is closed and water does not seep back into the boat. When the boat is travelling in Direction D, the force of the water on coiled tube 61 forces the tube into the position shown by the dotted line. Water is removed from inside the boat hull 60 by a venturi effect at the distal end of tube 61. The automatic drain feature also may be used on stationary containers, buildings and the like which are surrounded by flowing water.

A toy, novelty or party favour known as a blow-out has, in the past been made with a tube of tissue or thin paper, e.g. 125 μm thick, coiled with a fine wire coiled spring. One end of the tube is connected to a plastic mouthpiece, often with a whistle inside. The other end is closed and sometimes has a small feather attached thereto. At rest, the spring keeps the paper tube coiled. When a person blows air into the mouthpiece, the air causes the whistle to sound and also inflates the tube, causing the tube to uncoil. The closed or feathered end of the tube extends away from the person. When the person stops blowing air, the tube deflates and returns to its coiled position as a result of the action of the fine wire spring which is inside the tube.

One embodiment of the present invention is a blow out party favour comprising a mouthpiece attached to a thin memory-set retractable tube of crystalline or semi-crystalline thermoplastic polymer, said tube having two ends, one of which is distal from the mouthpiece and is at least partially closed and the other end of which is attached to the mouthpiece through which air may flow, said tube being memory-set in such shape that said sheet is able to move from a coiled form to an elongated form when air is blown through the mouthpiece and to retract to said coiled form when air is no longer blown through the mouthpiece. The end that is distal to the mouthpiece may be fully closed so that no air escapes or partially closed so that a small portion of the air escapes. The blow out is preferably made from polyester film 40 μm to 100 μm, preferably from 50 μm to 76 μm. The memory-set coil serves to return the tube to its coiled position without the aid of wire springs or the like.

While the invention has been described in some detail with reference to the Figures, it will be appreciated that numerous changes in the details and construction of the device can be made without departing from the spirit and scope of the invention.

We claim:

1. A retractable conduit which comprises a spirally coiled, memory-set, elongated sheet selected from the group consisting of crystalline and semi-crystalline thermoplastic polymer sheets, said sheet having two ends, one of which is attachable to the exterior of a spout, said sheet being sheathed in a flexible tubular film such that there is a first elongated portion of flexible tubular film on one side of the memory-set sheet and a second elongated portion of flexible tubular film on the opposing side of the memory-set sheet, said second portion being perforated at intervals along its length, there also being a flexible elongated film interposed between said memory-set sheet and the second portion, such that the memory-set sheet and the flexible elongated film may be attached to the spout with the spout between the memory-set sheet and the flexible elongated film.

2. A retractable conduit according to claim 1 wherein said memory-set sheet is made from a material selected form the group consisting of a polyamide and a polyester.

3. A retractable conduit according to claim 2 wherein the polyester is polyethylene terephthalate.

4. A retractable conduit according to either of claims 1 or 3 wherein the polyester memory-set sheet is at least 75 μm thick.

5. A retractable conduit according to either of claims 1 or 3 wherein the polyester memory-set sheet is from 75 μm thick to 1000 μm thick.

6. A retractable conduit according to either of claims 1 or 3 wherein the tubular film is a polyethylene film.

7. A retractable conduit according to claim 1 wherein the tubular film is selected from the group of films consisting of polyamide, polyester and polyolefin films.

8. A retractable conduit according to any one of claims 1, 3 and 7 wherein the distal end is attached to a spool.

9. A retractable conduit according to any one of claims 1 and 7 wherein the distal end is attached to a spool, said spool having flanges adjoined coaxially by a spindle, the distance between the flanges at the periphery of said flanges being greater than the distance between the flanges at the center of the flanges.

10. A retractable conduit according to claim 4 wherein the interposed flexible film is polyethylene.

11. A retractable conduit according to claim 1 wherein the polyester memory-set sheet is at least 75 μm thick and the sheet is selected from the group consisting of machine direction oriented and biaxially oriented sheets.

12. A retractable conduit which comprises a memory-set, elongated sheet selected from the group consisting of crystalline or semi-crystalline thermoplastic polymer, said sheet having two ends, one of which is attachable to the exterior of a spout through which fluid may flow, said sheet being shaped and memory-set in such shape that said sheet is able to move from a compact form to an elongated form when a force is applied thereto and to retract to said compact form when said force is removed, the fluid exerting said force when flowing over said sheet, and wherein one of the two ends of the memory-set sheet is distal to the attachable end and the distal end is wider than the attachable end, and wherein edges of the sheet between the attachable and distal ends are curled to provide a channel to assist the fluid in exerting said force.

13. A retractable conduit which comprises a memory-set, elongated sheet selected from the group consisting of crystalline or semi-crystalline thermoplastic polymer, said sheet having two ends, one of which is attachable to the exterior of a spout through which fluid may flow, said sheet being shaped and memory-set in such shape that said sheet is able to move from a compact form to an elongated form when a force is applied thereto and to retract to said compact form when said force is removed, the fluid exerting said force when flowing over said sheet, and wherein the compact form is an accordion-shaped form.

14. A retractable conduit which comprises a) an elongated flexible thin-walled tube of film having an inlet end and a distal end; b) a substantially inextensible sheet selected from the group consisting of crystalline or semicrystalline memory-set thermoplastic polymer located within said tube and extending for substantially the length of the tube, said sheet being shaped and memory-set in such shape that said sheet is able to move from a compact form to an elongated form when a force is applied thereto and to retract to said compact form when said force is removed; and c) means for connecting the inlet end of said tube to a spout source for fluid, the fluid exerting said force when flowing in said tube, and wherein said compact form is accordion-shaped.

15. A retractable conduit which comprises a) an elongated flexible thin-walled tube of film having an inlet end and a distal end; b) a substantially inextensible sheet selected from the group consisting of crystalline or semicrystalline memory-set thermoplastic polymer located within said tube and extending for substantially the length of the tube, said sheet being shaped and memory-set in such shape that said sheet is able to move from a compact form to an elongated form when a force is applied thereto and to retract to said compact form when said force is removed; and c) means for connecting the inlet end of said tube to a spout source for fluid, the other end of said tube comprising a distal end, the fluid exerting said force when flowing in said tube, and wherein the distal end is attached to a spool.

16. A retractable conduit which comprises a) an elongated flexible thin-walled tube of film having an inlet end and a distal end; b) a substantially inextensible sheet selected from the group consisting of crystalline or semicrystalline memory-set thermoplastic polymer located within said tube and extending for substantially the length of the tube, said sheet being shaped and memory-set in such shape that said sheet is able to move from a compact form to an elongated form when a force is applied thereto and to retract to said compact form when said force is removed; and c) means for connecting the inlet end of said tube to a spout source for fluid, the other end of said tube comprising a distal end, the fluid exerting said force when flowing in said tube, and wherein the distal end is attached to a spool, said spool having flanges adjoined coaxially by a spindle, the distance between the flanges at the periphery of said flanges being greater than the distance between the flanges at the center of the flanges.

17. A retractable conduit which comprises a spirally coiled, memory-set, elongated sheet of a polymer selected from the group consisting of crystalline or semi-crystalline thermoplastic polymer, said sheet having two ends and two longitudinal edges, one of said ends being attachable to the exterior of a spout and the other end comprising a distal end, said distal end of the memory-set sheet being attached to a spool, said longitudinal edges being attached to corresponding edges of a film or sheet of a second thermoplastic polymer to form a hose, and wherein said memory-set sheet is made from a polymer selected from the group consisting of a polyamide and a polyester.

18. A retractable conduit which comprises a spirally coiled, memory-set, elongated sheet of a polymer selected from the group consisting of crystalline or semi-crystalline thermoplastic polymer, said sheet having two ends and two longitudinal edges, one of said ends being attachable to the exterior of a spout and the other end comprising a distal end, said distal end being attached to a spool, said spool having flanges adjoined coaxially by a spindle, the distance between the flanges at the periphery of said flanges being greater than the distance between the flanges at the center of the flanges, said longitudinal edges being attached to corresponding edges of a film or sheet of a second thermoplastic polymer to form a hose, and wherein said memory-set sheet is made from a polymer selected from the group consisting of a polyamide and a polyester.

19. A retractable conduit which comprises a) an elongated flexible thin-walled tube of film having an inlet end and a distal end; b) a substantially inextensible sheet of crystalline or semicrystalline memory-set thermoplastic polymer located within said tube and extending for substantially the length of the tube, said sheet being shaped and memory-set in such shape that said sheet is able to move from a compact form to an elongated form when a force is applied thereto and to retract to said compact form when said force is removed, said memory-set sheet being reverse wound, a spool for supporting the sheet in the compact form, and wherein said distal end is attached to said spool, and c) means for connecting the inlet end of said tube to a spout source for fluid, the fluid exerting said force when flowing in said tube.

* * * * *